United States Patent
Ryan et al.

(10) Patent No.: US 7,095,579 B1
(45) Date of Patent: Aug. 22, 2006

(54) DISK DRIVE EMPLOYING MOMENTUM BASED UNLOAD DURING POWER FAILURE

(75) Inventors: Robert P. Ryan, Mission Viejo, CA (US); Ashok K. Desai, Westlake Village, CA (US); Hemant Melkote, San Jose, CA (US); Jenghung Chen, Cupertino, CA (US); John R. Agness, Laguna Hills, CA (US); Terry C. Dawson, San Diego, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/143,839

(22) Filed: Jun. 2, 2005

(51) Int. Cl.
   *G11B 21/02* (2006.01)
(52) U.S. Cl. .................................................. 360/75
(58) Field of Classification Search ................ None
   See application file for complete search history.

(56) References Cited

U.S. PATENT DOCUMENTS

| | | | |
|---|---|---|---|
| 4,864,437 A | 9/1989 | Couse et al. | |
| 5,969,899 A | 10/1999 | Utenick et al. | |
| 6,064,539 A | 5/2000 | Null et al. | |
| 6,081,112 A | 6/2000 | Carobolante et al. | |
| 6,097,564 A | 8/2000 | Hunter | |
| 6,140,784 A | 10/2000 | Mazda | |
| 6,560,057 B1 * | 5/2003 | Klaassen et al. | 360/75 |
| 6,765,746 B1 | 7/2004 | Kusumoto | |

* cited by examiner

*Primary Examiner*—Hoa T. Nguyen
*Assistant Examiner*—Mitchell Slavitt
(74) *Attorney, Agent, or Firm*—Jason T. Evans, Esq.; Howard H. Sheerin, Esq.

(57) ABSTRACT

A disk drive is discloses comprising a disk, a head connected to a distal end of an actuator arm, and a voice coil motor (VCM) for rotating the actuator arm about a pivot in order to actuate the head radially over the disk. If when a power failure occurs the radial location of the head is less than a predetermined distance from the outer diameter of the disk, the VCM is controlled to move the head toward the inner diameter of the disk and stopping the head before it reaches the inner diameter of the disk. The VCM is then controlled to move the head toward the outer diameter of the disk until the actuator arm unloads onto a ramp.

12 Claims, 4 Drawing Sheets

DISK DRIVE EMPLOYING MOMENTUM BASED UNLOAD DURING POWER FAILURE

BACKGROUND OF THE INVENTION

1. Field of the Invention

The present invention relates to disk drives. More particularly, the present invention relates to a disk drive employing momentum based unload during power failure.

2. Description of the Prior Art

FIG. 1A shows a prior art disk drive comprising a head 2 connected to a distal end of an actuator arm 4 which is rotated about a pivot by a voice coil motor (VCM) in order to actuate the head 2 radially over a disk 6. The VCM comprises a voice coil 8 that generates a magnetic flux when energized with current. The magnetic flux generated by the voice coil 8 interacts with magnetic flux generated by permanent magnets (not shown) to generate a torque that rotates the actuator arm about the pivot.

A spindle motor (not shown) rotates the disk 6 while the head 2 accesses a target data track on the disk 6. During a power failure, the head 2 is parked using the back EMF (BEMF) voltage present over the spindle motor windings due to the angular momentum of the spindle and disk assembly. Energy stored in a capacitor may provide additional current to assist the parking operation. In disk drives that employ ramp load/unload, the VCM rotates the actuator arm 4 toward the outer diameter of the disk 6 and onto a ramp 10. Due to torque constraints of the VCM, prior art disk drives typically rely on the momentum of the actuator arm 4 when it reaches the ramp 10 to help carry the actuator arm onto and up the ramp 10. This requires the velocity of the actuator arm 4 to reach a predetermined threshold before it reaches the ramp 10.

FIGS. 1B and 1C illustrate a prior art technique for ensuring the actuator arm 4 reaches the desired velocity before reaching the ramp 10 during the unload operation. As shown in FIG. 1B, when a power failure occurs, the BEMF of the spindle motor is used to move the head 2 to the inner diameter of the disk 6. A constant voltage is applied to the voice coil 8 until a tang 12 coupled to the voice coil 8 contacts an inner arm 14A of a crash stop 16. As shown in FIG. 1C, a constant voltage is then applied to the voice coil 8 to move the head 2 toward the outer diameter of the disk 6 at a constant velocity. This ensures the actuator arm will reach the desired velocity and corresponding momentum to carry the actuator arm 4 onto and up the ramp 10. The outer arm 14A of the crash stop 16 contacts the tang 12 to limit further outward movement once the actuator arm 4 is safely unloaded onto the ramp 10.

Moving the head 2 to the inner diameter of the disk 6 and then to the outer diameter of the disk 6 to ensure the actuator arm 4 reaches the desired velocity results in an inefficient use of power since it is not necessary for the actuator arm 4 to traverse its entire stroke to attain the desired velocity. This increases the overall cost of the disk drive as it requires a more efficient (expensive) VCM to ensure the unload operation finishes before the BEMF voltage generated by the spindle motor dissipates. There is, therefore, a need to improve power efficiency when unloading the actuator arm 4 onto the ramp 10 during power failure.

SUMMARY OF THE INVENTION

The present invention may be regarded as a disk drive comprising a disk, an actuator arm, a head connected to a distal end of the actuator arm, a voice coil motor (VCM) for rotating the actuator arm about a pivot to actuate the head radially over the disk, and a ramp positioned near an outer diameter of the disk. During a power failure, disk control circuitry executes an unload operation to unload the actuator arm onto the ramp. During normal operation, the disk control circuitry monitors the radial location of the head. If the radial location of the head is greater than a predetermined distance from the outer diameter of the disk when the power failure occurs, the VCM is controlled to move the head toward the outer diameter of the disk until the actuator arm unloads onto the ramp. If the radial location of the head is less than the predetermined distance from the outer diameter of the disk when the power failure occurs, the VCM is controlled to move the head toward the inner diameter of the disk and stopping the head before it reaches the inner diameter of the disk, and then the VCM is controlled to move the head toward the outer diameter of the disk until the actuator arm unloads onto the ramp.

In one embodiment, the disk drive comprises a spindle motor that generates a back EMF voltage used to power the VCM during the unload operation.

In another embodiment, the VCM generates a back EMF voltage, the disk control circuitry estimates a velocity of the actuator arm from the back EMF voltage generated by the VCM, and the disk control circuitry controls the velocity of the actuator arm in response to the estimated velocity.

In yet another embodiment, the disk control circuitry controls the VCM to rotate the actuator arm at a predetermined velocity for a first interval in order to move the head toward the inner diameter of the disk, wherein the disk control circuitry stops the head after the first predetermined interval. In one embodiment, the disk control circuitry controls the VCM to rotate the actuator arm at a predetermined velocity for a second interval in order to move the head toward the outer diameter of the disk. In one embodiment, the disk control circuitry computes at least one of the first and second intervals in response to the radial location of the head when the power failure occurs.

The present invention may be regarded as a method of unloading an actuator arm onto a ramp in a disk drive during a power failure, the disk drive comprising a disk, the actuator arm, a head connected to a distal end of the actuator arm, a voice coil motor (VCM) for rotating the actuator arm about a pivot to actuate the head radially over the disk, and the ramp positioned near an outer diameter of the disk. During normal operation, the radial location of the head is monitored. If the radial location of the head is greater than a predetermined distance from the outer diameter of the disk when the power failure occurs, the VCM is controlled to move the head toward the outer diameter of the disk until the actuator arm unloads onto the ramp. If the radial location of the head is less than the predetermined distance from the outer diameter of the disk when the power failure occurs, the VCM is controlled to move the head toward the inner diameter of the disk and stopping the head before it reaches the inner diameter of the disk, and then the VCM is controlled to move the head toward the outer diameter of the disk until the actuator arm unloads onto the ramp.

DESCRIPTION OF THE PREFERRED EMBODIMENTS

Figure 2A:
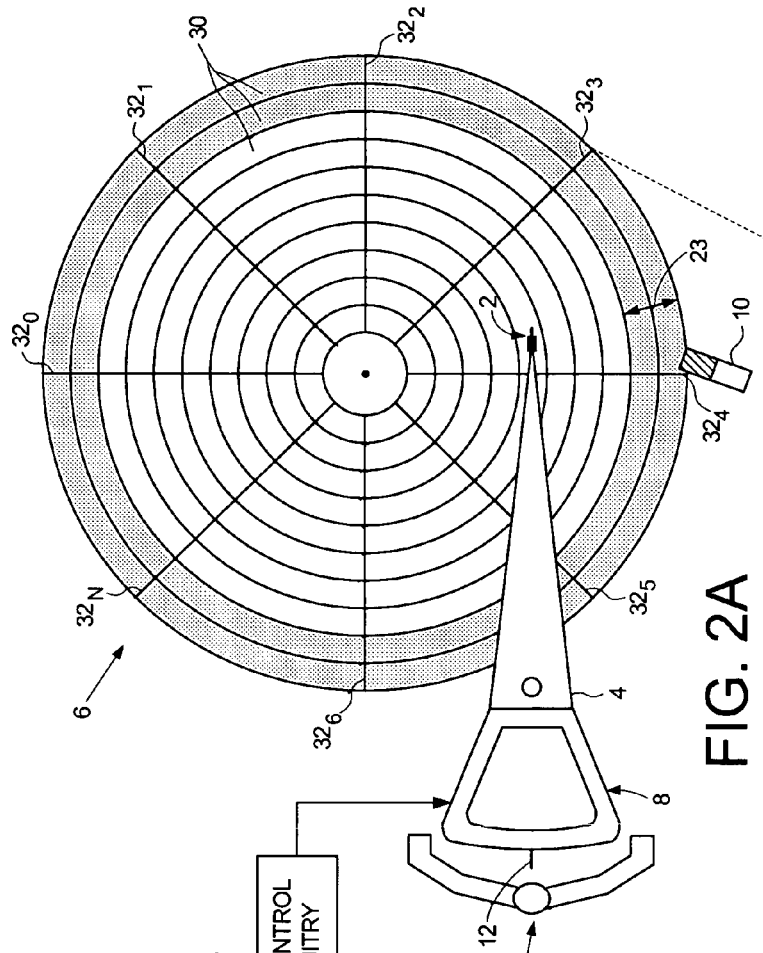
FIG. 2A shows a disk drive according to an embodiment of the present invention comprising a disk, a head connected to a distal end of an actuator arm, and a voice coil motor for rotating the actuator arm about a pivot to actuate the head over the disk and to unload the actuator arm onto a ramp.

FIG. 2A shows a disk drive according to an embodiment of the present invention comprising a disk 6, an actuator arm 4, a head 2 connected to a distal end of the actuator arm 4, a voice coil motor (VCM) for rotating the actuator arm 4 about a pivot to actuate the head 2 radially over the disk 6, and a ramp 10 positioned near an outer diameter of the disk 6. During a power failure, disk control circuitry 18 executes an unload operation (FIG. 2C) to unload the actuator arm 4 onto the ramp 10. At step 20 of FIG. 2C, the disk control circuitry 18 monitors the radial location of the head 6. If a power failure is detected at step 22, and the radial location of the head 2 is greater than a predetermined distance 23 from the outer diameter of the disk 6 at step 24 when the power failure occurs, the VCM is controlled at step 28 to move the head 2 toward the outer diameter of the disk 6 until the actuator arm 4 unloads onto the ramp 10. If the radial location of the head 2 is less than the predetermined distance 23 from the outer diameter of the disk 6 when the power failure occurs, the VCM is controlled at step 26 to move the head 2 toward the inner diameter of the disk 6 and stopping the head 2 before it reaches the inner diameter of the disk 6, and then the VCM is controlled at step 28 to move the head 2 toward the outer diameter of the disk 6 until the actuator arm 4 unloads onto the ramp 10.

Figure 2B:
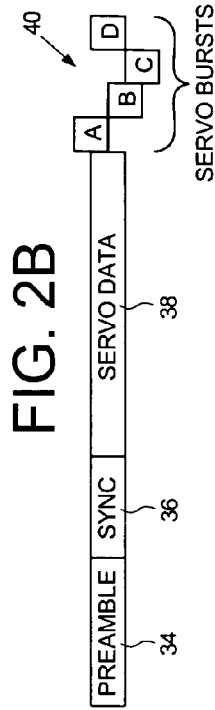
FIG. 2B shows a format of an embedded servo sector recorded on the disk.
Figure 2C:
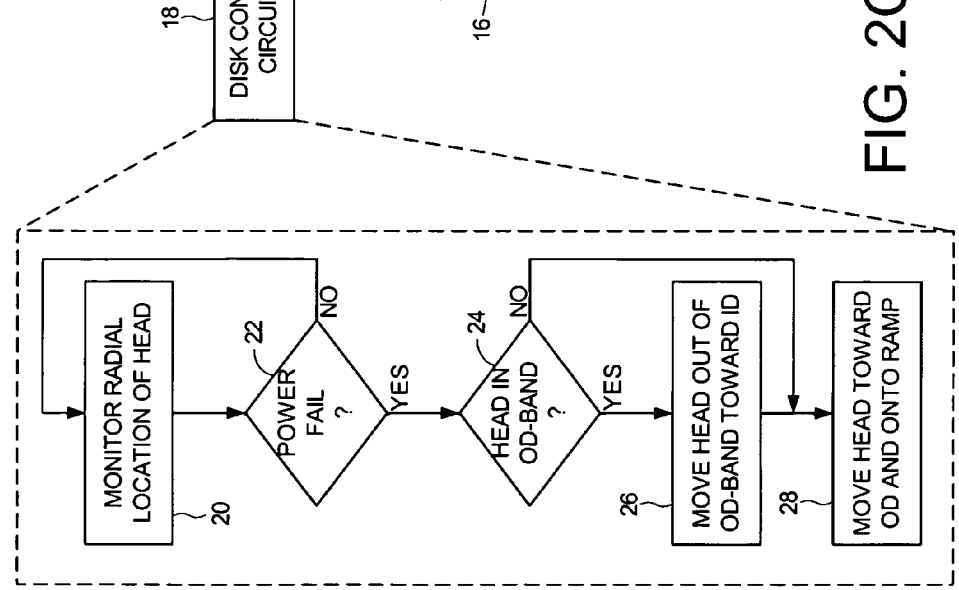
FIG. 2C is a flow diagram according to an embodiment of the present invention for unloading the actuator arm onto the ramp during a power failure by first moving the head out of a predetermined outer band of the disk before moving the actuator arm to the outer diameter of the disk and onto the ramp.

In the embodiment of FIG. 2A, the disk 6 comprises a plurality of radially spaced, concentric tracks 30, and the predetermined distance 23 for detecting whether to execute step 26 of FIG. 2C is represented as a band of outer diameter tracks (OD-band 23). That is, if the head 2 is within an OD-band 23 when the power failure occurs, step 26 is executed to move the head out of the OD-band 23 toward the inner diameter before unloading the actuator arm 4 onto the ramp 10. In one embodiment, the radial location of the head 2 is determined by reading embedded servo sectors $32_0$–$32_N$ recorded on the disk 6 as shown in FIG. 2A. FIG. 2B shows an example format of an embedded servo sector $32_3$ comprising a preamble 34 for synchronizing gain control and timing recovery, a sycn mark 36 for symbol synchronizing to a servo data field 38, and servo bursts 40. The servo data field 38 records coarse positioning information, such as a track address, and the servo bursts 40 provide fine positioning information for maintaining the head 2 over the centerline of the target track during read and write operations.

In one embodiment, the disk control circuitry 18 continuously monitors the radial location of the head 2 at step 20 of FIG. 2C during normal operation of the disk drive, for example, by continuously updating a register with the current track address as the head 2 passes over each servo sector 32. In this manner the radial location of the head 2 is available immediately during a power failure. In one embodiment, the disk control circuitry 18 maintains a flag (e.g., a bit in a register) indicating whether the head 2 is located within the OD-band 23. In this manner, the circuitry responsible for unloading the actuator arm 4 during a power failure need only evaluate the state of the flag to determine whether step 26 of FIG. 2C should be executed.

Figure 1A:
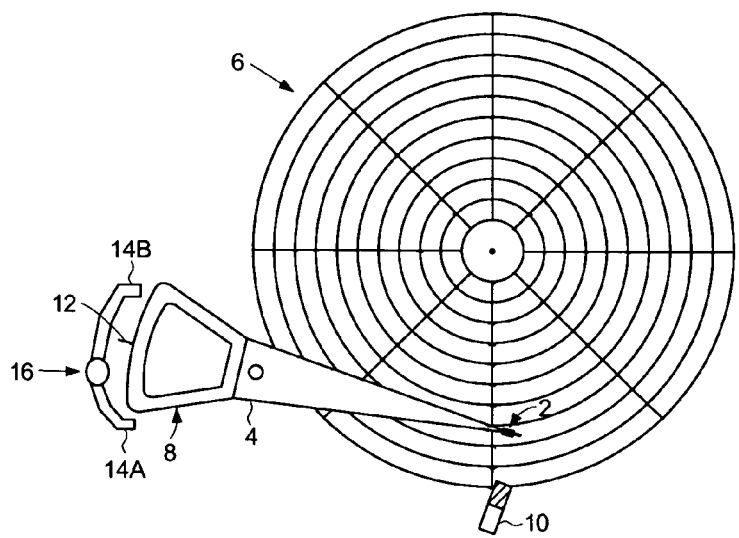
FIGS. 1A–1C illustrate a prior art technique for performing an unload operation by first moving the head to the inner diameter of the disk, and then to the outer diameter and onto the ramp.
Figure 1B:
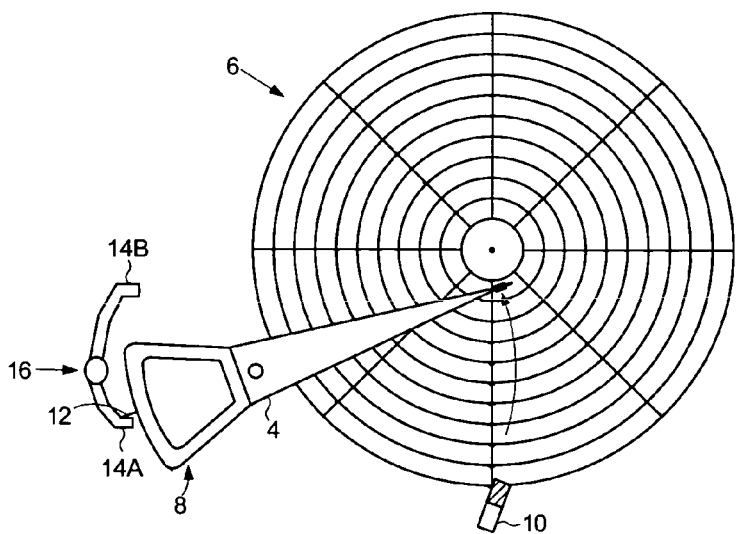
Figure 1C:
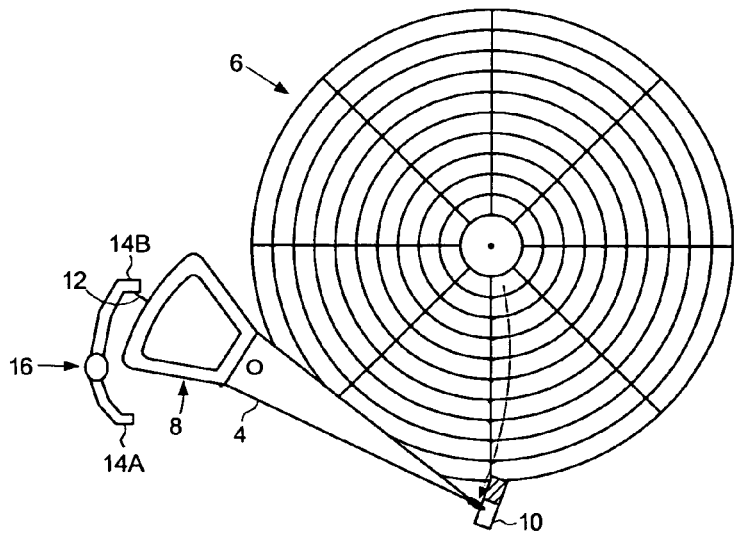
Figure 3A:
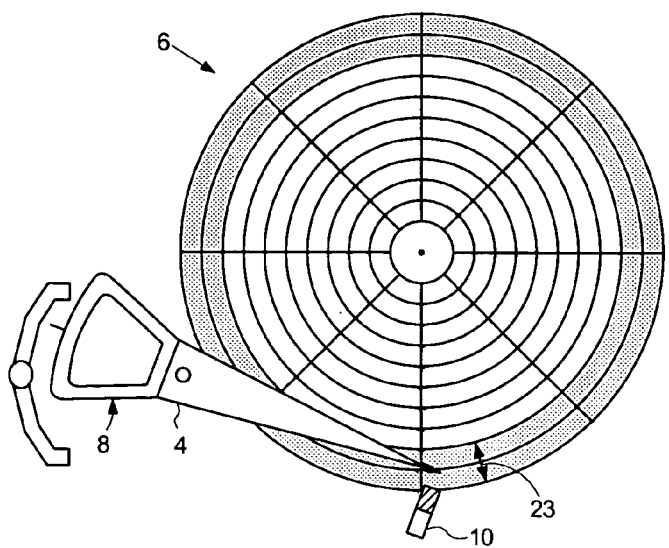
FIGS. 3A–3C illustrate the unload operation according to an embodiment of the present invention wherein the head is first moved toward the inner diameter of the disk and stopping the head before reaching the inner diameter of the disk, and then moving the head toward the outer diameter of the disk until the actuator arm unloads onto the ramp.
Figure 3B:
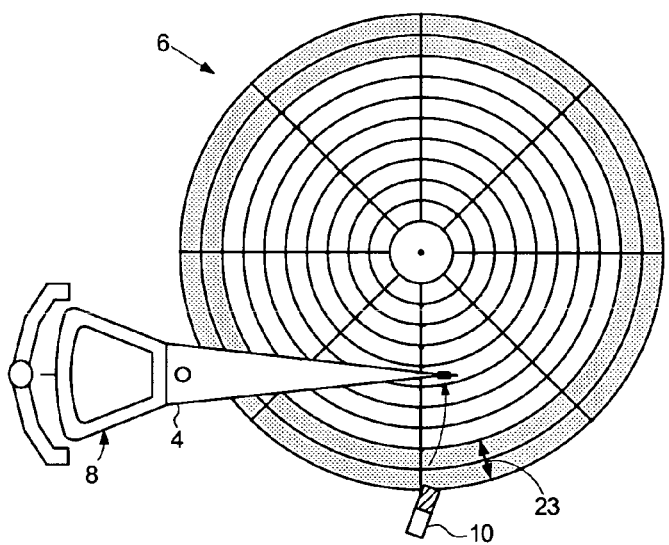
Figure 3C:
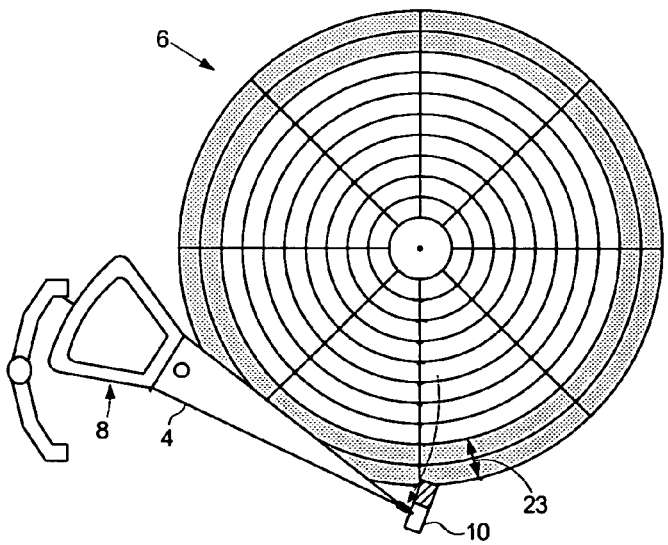

FIGS. 3A–3C illustrate the unload operation of FIG. 2C as compared to the prior art unload operation of FIGS. 1A–1C. In FIG. 3A, a power failure occurs while the head is within the OD-band 23 so that in FIG. 3B the head is moved toward the inner diameter of the disk 6 and stopped before reaching the inner diameter of the disk 6. In FIG. 3C, the head is then moved toward the outer diameter of the disk 6 until the actuator arm 4 unloads onto the ramp 10. Moving the head less than the entire stroke of the actuator arm 4 improves power efficiency which enables the use of less expensive motors (VCM and/or spindle motor) while ensuring reliable unloads.

Figure 4:
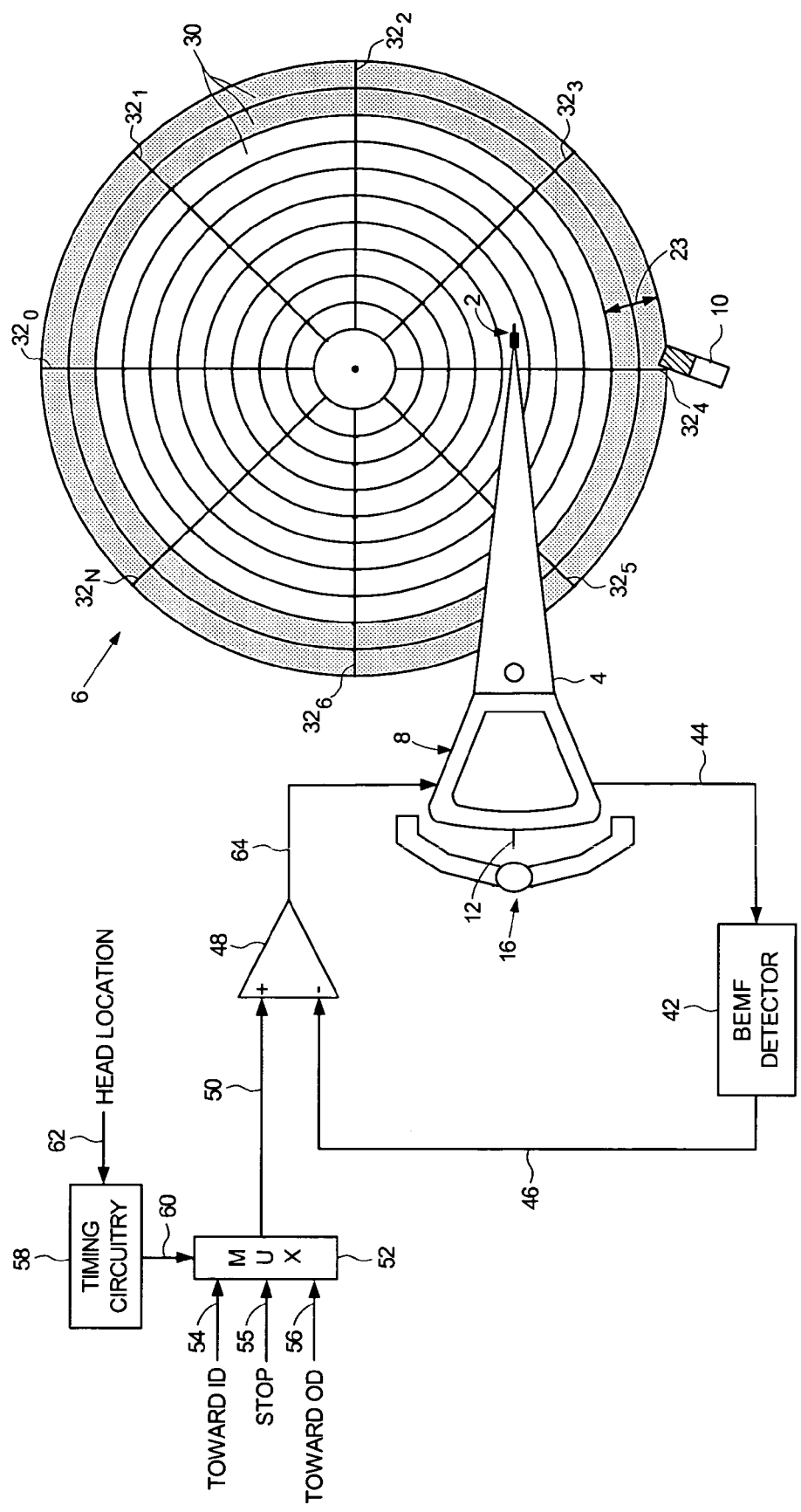
FIG. 4 shows circuitry employed in a disk drive according to an embodiment of the present invention for performing the unload operation by monitoring a back EMF voltage generated by the VCM.

Any suitable circuitry may be employed in the embodiments of the present invention for performing the unload operation. In addition, the velocity of the actuator arm 4 may be controlled using open-loop or closed-loop servo control. FIG. 4 shows example circuitry according to an embodiment of the present invention for implementing the unload operation. In this embodiment, the back EMF voltage generated by the VCM is used to control the velocity of the actuator arm using closed-loop servo control. A back EMF detector 42 processes the back EMF voltage 44 generated by the voice coil 8 of the VCM to generate a velocity estimate 46 of the actuator arm 4. Any suitable circuitry may be used to implement the back EMF detector 42, such as a sense resistor in series with the voice coil 8. The back EMF detector 42 may also comprise circuitry that cancels the contribution of the resistance and/or inductance of the voice coil 8 so that the back EMF voltage 44 provides a better estimate of velocity.

The velocity estimate 46 output by the back EMF detector 42 is compared by comparator 48 to a velocity command 50 output by multiplexer 52 which selects between a "toward ID" velocity command 54 for moving the head 2 out of the OD-band 23 toward the inner diameter of the disk 6, a "stop" velocity command 55 for stopping the head 2, and a "toward OD" velocity command 56 for moving the head 2 toward the outer diameter of the disk 6 until the actuator arm 4 unloads onto the ramp 10. Timing circuitry 58 generates a control signal 60 for controlling the multiplexer 52 in order to select the appropriate velocity command at the appropriate time. The timing circuitry 58 evaluates the head location 62 to determine whether the head 2 is within the OD-band 23 when the power failure occurs. If so, the timing circuitry 58 selects the "toward ID" velocity command 54 as the velocity command 50 applied to the comparator 48. The comparator 48 applies a control signal 64 to the VCM to rotate the actuator arm 4 at a predetermined velocity for a first interval (as determined by the timing circuitry 58) in order to move the head 2 toward the inner diameter of the disk 6. At the end of the first interval, the timing circuitry 58 selects the "stop" velocity command 55 as the output of multiplexer 52 which is applied to the comparator 48 in order to stop the head 2 prior to reaching the inner diameter of the disk 6. The timing circuitry 58 then selects the "toward OD" velocity command 56 as the output of multiplexer 52 which is applied to the comparator 48 in order to move the head 2 toward the outer diameter of the disk 6 for a second interval. The second interval is selected to ensure the actuator arm 4 will successfully unload onto the ramp 10.

In one embodiment, the first and second intervals implemented in the timing circuitry 58 are fixed regardless as to the actual radial location of the head 2 within the OD-band 23 when the power failure occurs. In an alternative embodiment, the timing circuitry 58 computes at least one of the first and second intervals in response to the radial location of the head 2 when the power failure occurs. For example, in one embodiment the timing circuitry 58 selects the first interval so that the head 2 always moves a predetermined number of tracks away from the outer diameter of the disk 6. This means the first interval is reduced if the head 2 is near the inner diameter of the OD-band 23 when the power failure occurs, and increased if the head 2 is near the outer diameter of the OD-band 23 when the power failure occurs.

We claim:

1. A disk drive comprising:
   (a) a disk;
   (b) an actuator arm;
   (c) a head connected to a distal end of the actuator arm;
   (d) a voice coil motor (VCM) for rotating the actuator arm about a pivot to actuate the head radially over the disk;
   (e) a ramp positioned near an outer diameter of the disk;
   (d) disk control circuitry for executing an unload operation to unload the actuator arm onto the ramp during a power failure by:
      monitoring a radial location of the head;
      if the radial location of the head is greater than a predetermined distance from the outer diameter of the disk when the power failure occurs, controlling the VCM to move the head toward the outer diameter of the disk until the actuator arm unloads onto the ramp; and
      if the radial location of the head is less than the predetermined distance from the outer diameter of the disk when the power failure occurs:
         controlling the VCM to move the head toward the inner diameter of the disk and stopping the head before it reaches the inner diameter of the disk; and
         controlling the VCM to move the head toward the outer diameter of the disk until the actuator arm unloads onto the ramp.

2. The disk drive as recited in claim 1, further comprising a spindle motor for rotating the disk, wherein a back EMF voltage generated by the spindle motor is used to power the VCM during the unload operation.

3. The disk drive as recited in claim 1, wherein:
   (a) the VCM generates a back EMF voltage;
   (b) the disk control circuitry estimates a velocity of the actuator arm from the back EMF voltage generated by the VCM; and
   (c) the disk control circuitry controls the velocity of the actuator arm in response to the estimated velocity.

4. The disk drive as recited in claim 1, wherein the disk control circuitry controls the VCM to rotate the actuator arm at a predetermined velocity for a first interval in order to move the head toward the inner diameter of the disk, wherein the disk control circuitry stops the head after the first predetermined interval.

5. The disk drive as recited in claim 4, wherein the disk control circuitry controls the VCM to rotate the actuator arm at a predetermined velocity for a second interval in order to move the head toward the outer diameter of the disk.

6. The disk drive as recited in claim 5, wherein the disk control circuitry computes at least one of the first and second intervals in response to the radial location of the head when the power failure occurs.

7. A method of unloading an actuator arm onto a ramp in a disk drive during a power failure, the disk drive comprising a disk, the actuator arm, a head connected to a distal end of the actuator arm, a voice coil motor (VCM) for rotating the actuator arm about a pivot to actuate the head radially over the disk, and the ramp positioned near an outer diameter of the disk, the method comprising the steps of:
   (a) monitoring a radial location of the head;
   (b) if the radial location of the head is greater than a predetermined distance from the outer diameter of the disk when then power failure occurs, controlling the VCM to move the head toward the outer diameter of the disk until the actuator arm unloads onto the ramp; and
   (c) if the radial location of the head is less than the predetermined distance from the outer diameter of the disk when the power failure occurs:
      controlling the VCM to move the head toward the inner diameter of the disk and stopping the head before it reaches the inner diameter of the disk; and
      controlling the VCM to move the head toward the outer diameter of the disk until the actuator arm unloads onto the ramp.

8. The method as recited in claim 7, wherein the disk drive further comprises a spindle motor for rotating the disk, wherein a back EMF voltage generated by the spindle motor is used to power the VCM during the unload operation.

9. The method as recited in claim 7, wherein the VCM generates a back EMF voltage, further comprising the steps of:
   (a) estimating a velocity of the actuator arm from the back EMF voltage generated by the VCM; and
   (b) controlling the velocity of the actuator arm in response to the estimated velocity.

10. The method as recited in claim 7, wherein the step of controlling the VCM to move the head toward the inner diameter of the disk comprises the steps of:
    (a) rotating the actuator arm at a predetermined velocity for a first interval in order to move the head toward the inner diameter of the disk; and
    (b) stopping the head after the first predetermined interval.

11. The method as recited in claim 10, wherein the step of controlling the VCM to move the head toward the outer diameter of the disk comprises the step of rotating the actuator arm at a predetermined velocity for a second interval in order to move the head toward the outer diameter of the disk.

12. The method as recited in claim 11, further comprising the step of computing at least one of the first and second intervals in response to the radial location of the head when the power failure occurs.

* * * * *